(No Model.)
R. S. WARING.
TEST BOX FOR UNDERGROUND ELECTRIC WIRES OR CABLES.
No. 378,560.  Patented Feb. 28, 1888.
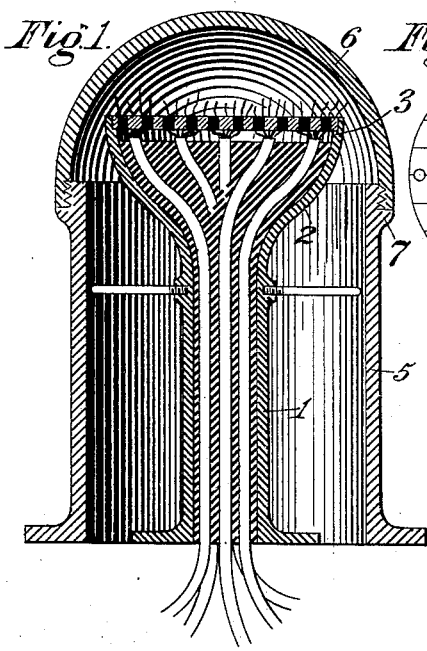
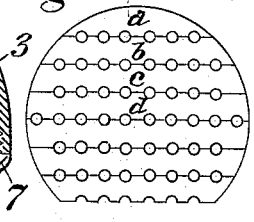
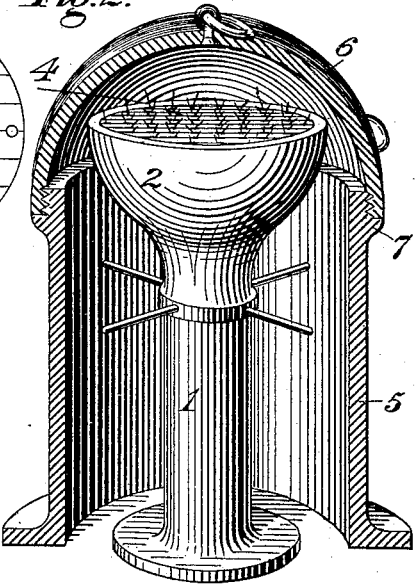
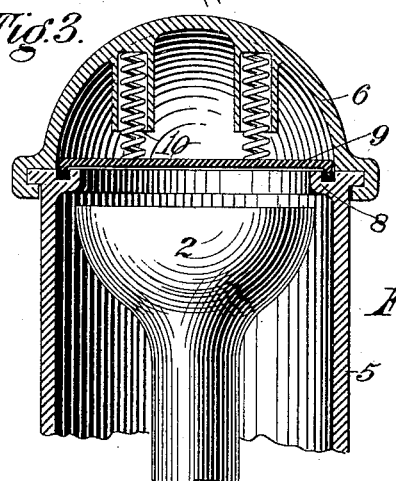
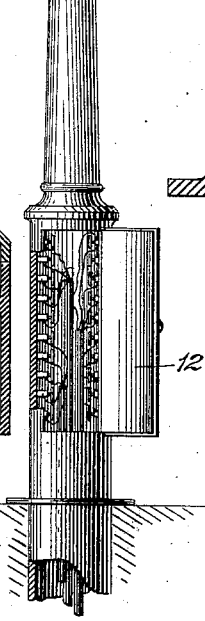
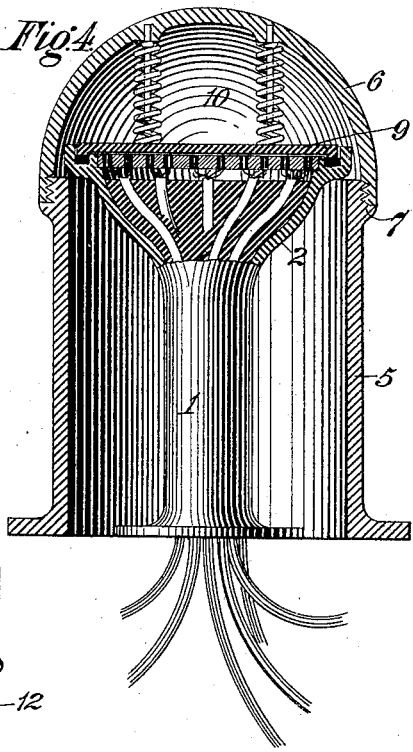
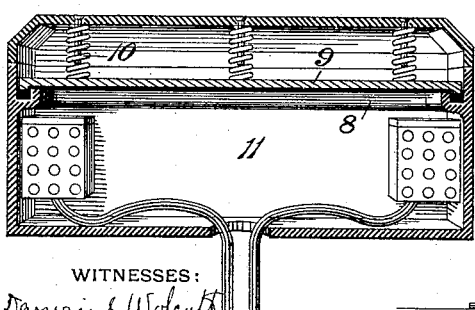
WITNESSES:
Dennis S. Wolcott
C. M. Clarke
INVENTOR,
Richard S. Waring
George H. Christy
Att'y.
N. PETERS, Photo-Lithographer, Washington, D. C.

United States Patent Office.

RICHARD S. WARING, OF PITTSBURG, PENNSYLVANIA.

TEST-BOX FOR UNDERGROUND ELECTRIC WIRES OR CABLES.

SPECIFICATION forming part of Letters Patent No. 378,560, dated February 28, 1888.

Application filed February 4, 1886. Serial No. 190,806. (No model.)

*To all whom it may concern:*

Be it known that I, RICHARD S. WARING, a citizen of the United States, residing at Pittsburg, in the county of Allegheny and State of Pennsylvania, have invented or discovered certain new and useful Improvements in Test-Boxes for Underground Electric Wires and Cables, of which improvements the following is a specification.

In the accompanying drawings, which make part of this specification, Figure 1 is a sectional elevation of my improved test-box and protector. Fig. 2 is a similar view showing the test-box in elevation. Figs. 3 and 4 are views similar to Fig. 1, showing certain modifications in construction. Fig. 5 is a sectional elevation of a modified form of test-box. Fig. 6 shows a testing-box arranged in a lamp-post. Fig. 7 shows a detail view of my improved distributing-board.

It has heretofore been customary to arrange the testing-boxes used in connection with underground conduits for the distribution of electrical wires and cables as boxes or pits under the surface of the ground, and provide therefor a cover which shall be, as nearly as practicable, water-tight. In such an arrangement the testing-boxes are very difficult of access, are expensive to build, and cannot be made water-tight on account of the seepage of water through the walls or bottoms thereof or around the joints, and are also objectionable on account of the collection of gases, either gas or sewer, therein.

The object of my invention is to provide a test-box which shall be readily accessible from the surface of the ground, and in which is avoided all liability of access of water or gas thereto, and which can also be used for various other purposes—as, for instance, hitching-posts, stepping stones, lamp-posts, &c.—and to which access can be had without interrupting the traffic along the street, which is impossible in the old system of underground boxes or pits located along the line of the street; and to this end my invention consists in the construction, combination, and arrangement of parts, substantially as hereinafter more fully described and claimed.

In carrying out my invention I secure on or near the curb of the pavement a hollow stand or support, 1, having an enlarged upper end, 2, for the spreading out and arrangement of the wires and cables, which are passed from the conduit located in the street or along the pavement up through the hollow standard and into the enlarged head. Around the inner edge of the enlarged head is formed a rib or flange, 3, on which is supported the distributing-board 4, which entirely fills the head. This board 4 is composed of a series of slats having their adjacent edges notched, such notches matching when the strips are placed together in proper order and forming circular holes for the reception of the individual wires. In arranging the wires in this testing-box one of the slats—as, for instance, $a$—is placed in position, wires are placed in its notches, and then the slat $b$ is placed in position against the slat $a$, lightly clamping the wires in the strip $a$. Then wires are placed in the notches in the outer edge of the slat $b$, and the slat $c$ is then put in. In this way all the wires passing up into the test-box, whether arranged in bunches, in cables, or individually, are secured each in its separate hole in the distributing-board, and as each hole is provided with an index mark or number connections and tests on any one or more of the wires can be readily had. This sectional construction of the board also affords ready means of access to the wires below the same without disturbing all of the wires arranged therein and held thereby. Around this hollow post or support is placed a cylindrical shell, 5, which is securely fastened to the pavement or curbing, and is provided at its upper end with suitable threads for engagement with the threads formed in the inner surface of the hemispherical cap, 6. This shell and cap will present, when placed together, an appearance similar to that presented by the caps of fire-plugs.

If desired, the enlarged head 2 may, after the wires or cables have been placed therein, be filled with tar or pitch, thereby excluding all moisture; and in order to prevent any moisture from entering into the shell or pillar, the joints between said shell and pillar and the paving stone or curb should be cemented or calked in any suitable manner. In order to make the joint between the shell and the cap perfectly tight, a rib, 7, is formed around said shell just below the screw-threads, on which is placed a suitable packing of rubber or other material, upon which the edge of the cap is caused to bear firmly when screwed onto the cylinder. This cap is provided with suitable rings or handles, whereby the same may be manipulated and to which horses may be tied.

In order to thoroughly protect the exposed ends of the wires projecting above the distributing-board, the shell or cylinder may be carried up a little beyond the top of the head 2, and provided on its inner surface with a projecting flange, 8, on which is placed a plate, 9, a rubber gasket or other suitable packing being arranged between the plate and the flange. This plate is pressed firmly down upon the rubber gasket by the springs 10, arranged in suitable sockets in the cap when said cap is secured in place, all as clearly shown in Fig. 3; or, in lieu of the above-described construction, the rim of the enlarged head 2 may be extended a little distance above the distributing-board and provided with a suitable shoulder for the support of the plate 9, said plate being held upon its shoulder by suitable springs attached to the cap in any suitable manner. In lieu of securing the cap onto the cylinder they may be connected by an ordinary bayonet-joint, the engaging-lugs being formed with suitable inclined surfaces to draw the cap firmly down onto the flange 7; or, in lieu of any of the above-described constructions, a box, 11, may be secured to the pavement or curb, and the wires or cables passed therein, and the ends of such wires electrically connected to a suitable distributing board or box located in the box 11. Around the upper edge of this box 11 is formed the inwardly-projecting flange 8, on which is arranged or placed a plate, 9, which is held in place by springs connected to the hinged cover 12 of the box 11. This box and cover can be used in lieu of a stepping-stone.

In order to obviate the obstructing of sidewalks or curbs by any additional structures, the distributing-board may be arranged in a suitably-constructed lamp-post, as shown in Fig. 6, said lamp-post being cast or formed with a suitable cavity at or near its base, in which the distributing board or box is arranged, said cavity or opening being provided with a suitable hinged door, which can be provided with a spring follower-plate adapted to bear against a suitable flange, so as to hermetically seal the cavity when the door is closed. In this case the wires are passed up into the cavity through the bottom of the lamp-post.

I claim herein as my invention—

1. In a testing-box for underground electric wires or cables, a hollow post or standard having an enlarged head and located at or near the curb of the street, projecting above the general level of such street, a switch-board supported by such post or structure, a shell surrounding said post, and a hemispherical cover therefor, substantially as set forth.

2. In a test-box for underground electric wires or cables, a hollow post or structure located at or near the curb of the street and above the general level thereof, a switch-board arranged within such structure, a box or cover for the structure, an auxiliary or inner shield or cover fitting within the structure, and springs arranged within the said lids or covers, substantially as set forth.

In testimony whereof I have hereunto set my hand.

RICHARD S. WARING.

Witnesses:
DARWIN S. WOLCOTT,
R. H. WHITTLESEY.